(12) United States Patent
Glenn

(10) Patent No.: US 6,778,220 B2
(45) Date of Patent: Aug. 17, 2004

(54) COLOR VIDEO CAMERA SYSTEM AND METHOD WITH OPTICAL PREFILTER

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 682 days.

(21) Appl. No.: 09/746,561

(22) Filed: Dec. 22, 2000

(65) Prior Publication Data

US 2001/0030696 A1 Oct. 18, 2001

Related U.S. Application Data

(63) Continuation-in-part of application No. 09/653,983, filed on Sep. 1, 2000.
(60) Provisional application No. 60/151,965, filed on Sep. 1, 1999, provisional application No. 60/171,361, filed on Dec. 22, 1999, and provisional application No. 60/171,360, filed on Dec. 22, 1999.

(51) Int. Cl.[7] .............................................. H04N 5/238

(52) U.S. Cl. ...................... 348/368; 348/236; 348/262; 348/344

(58) Field of Search ................................. 348/335, 343, 348/344, 367, 368, 236, 262, 263, 342

(56) References Cited

U.S. PATENT DOCUMENTS

| | | | | | |
|---|---|---|---|---|---|
| 4,876,591 A | * | 10/1989 | Muramatsu | ................. | 348/342 |
| 4,928,180 A | * | 5/1990 | Knibbe | ..................... | 348/368 |
| 5,915,047 A | * | 6/1999 | Muramoto | ................. | 348/342 |

* cited by examiner

Primary Examiner—Ngoc-Yen Vu
Assistant Examiner—Matthew L Rosendale
(74) Attorney, Agent, or Firm—Martin Novack

(57) ABSTRACT

A technique for producing electronic video signals representative of color images of a scene, includes the following steps: providing a luminance sensor and a color sensor having a color filter thereover; providing a beamsplitter, and providing a motion picture film camera type of lens system that focuses light from the image, via the beamsplitter, onto the luminance sensor and the color sensor; and producing electronic video signals from outputs of the luminance sensor and the color sensor.

20 Claims, 4 Drawing Sheets

COLOR VIDEO CAMERA SYSTEM AND METHOD WITH OPTICAL PREFILTER

RELATED APPLICATIONS

This is a continuation-in-part of U.S. patent application Ser. No. 09/653,983, filed Sep. 1, 2000, which, in turn, claimed priority from U.S. Provisional Patent Application No. 60/151,965, filed Sep. 1, 1999 and from U.S. Provisional Patent Application No. 60/171,361, filed Dec. 22, 1999. Also, the present Application claims priority from U.S. Provisional Patent Application No. 60/171,360 filed Dec. 22, 1999, and said Provisional Patent Application No. 60/171,360 is incorporated herein by reference.

FIELD OF THE INVENTION

This invention relates to a color video camera system that can be utilized for motion picture film origination, and also relates to an optical prefiltering method and apparatus that can be used in conjunction with a color video camera system.

BACKGROUND OF THE INVENTION

Color motion pictures are often made by shooting the action with a film camera, converting the images to digital form, computer processing the digital images, and then scanning the processed images back onto film for release. It would be advantageous to have a practical electronic color video camera that could directly shoot the action to obtain color video from which good quality color motion picture film could ultimately be produced, but this has not yet been achieved. A major reason is that the expensive high quality lenses used in motion picture film cameras have optical characteristics and requirements that are not readily adaptable to electronic video cameras. A 24 frames per second progressively scanned color video camera for electronic film origination has become available. It is a three-sensor camera that must use lenses designed for television cameras, and cannot achieve the image quality that is obtainable with the high quality lenses used in motion picture film cameras.

It is among the objects of the present invention to devise an electronic color video camera that can utilize the types of high quality lenses that are used in motion picture color film cameras. It is also among the objects of the present invention to provide an improved beamsplitter and optical prefilter for use in electronic color video cameras.

SUMMARY OF THE INVENTION

In a form of the parent application hereof, there is set forth a technique for producing electronic video signals representative of color images of a scene, comprising the following steps: providing a luminance sensor and a color sensor having a color filter thereover; providing a beamsplitter, and providing a motion picture film camera type of lens system that focuses light from the image, via the beamsplitter, onto the luminance sensor and the color sensor; and producing electronic video signals from outputs of the luminance sensor and the color sensor. In one embodiment of the invention in the parent application, the step of providing a beamsplitter comprises providing a pellicle beamsplitter. In another embodiment thereof, a rotating shutter/mirror is used as a temporal beamsplitter. In an embodiment of the present invention, the shutter/mirror is also utilized to achieve optical prefiltering, this being achieved by introducing a controlled wobble of the image reflected toward the color sensor.

In accordance with an embodiment of the present invention, there is set forth a method for producing electronic video signals representative of color images of a scene, comprising the following steps: providing a luminance sensor and a color sensor having a color filter thereover; providing a temporal beamsplitter, and providing a lens system that focuses light from the image, via the beamsplitter, alternately onto the luminance sensor and the color sensor; and producing electronic video signals from outputs of the luminance sensor and the color sensor; the step of providing a temporal beamsplitter comprising providing a rotating mechanical shutter that includes an open sector that passes light from the image toward the luminance sensor and a mirrored sector that reflects light from the image toward the color sensor in the path of light from the image, and rotating the shutter in a manner to cause a wobble of the image on the color sensor.

In a preferred embodiment of the invention, the step of rotating the shutter includes mounting the shutter on a shaft such that the shutter is offset from the normal to the shaft by an angle that causes the wobble. In this embodiment, the angle is preferably in the range between 1 second of arc and 1 degree of arc. Also, in a preferred embodiment, the color sensor has a characteristic pixel spacing, and the excursion of the image on said color sensor due to said wobble is at least half the pixel spacing.

Further features and advantages of the invention will become more readily apparent from the following detailed description when taken in conjunction with the accompanying drawings.

DETAILED DESCRIPTION

Figure 1:
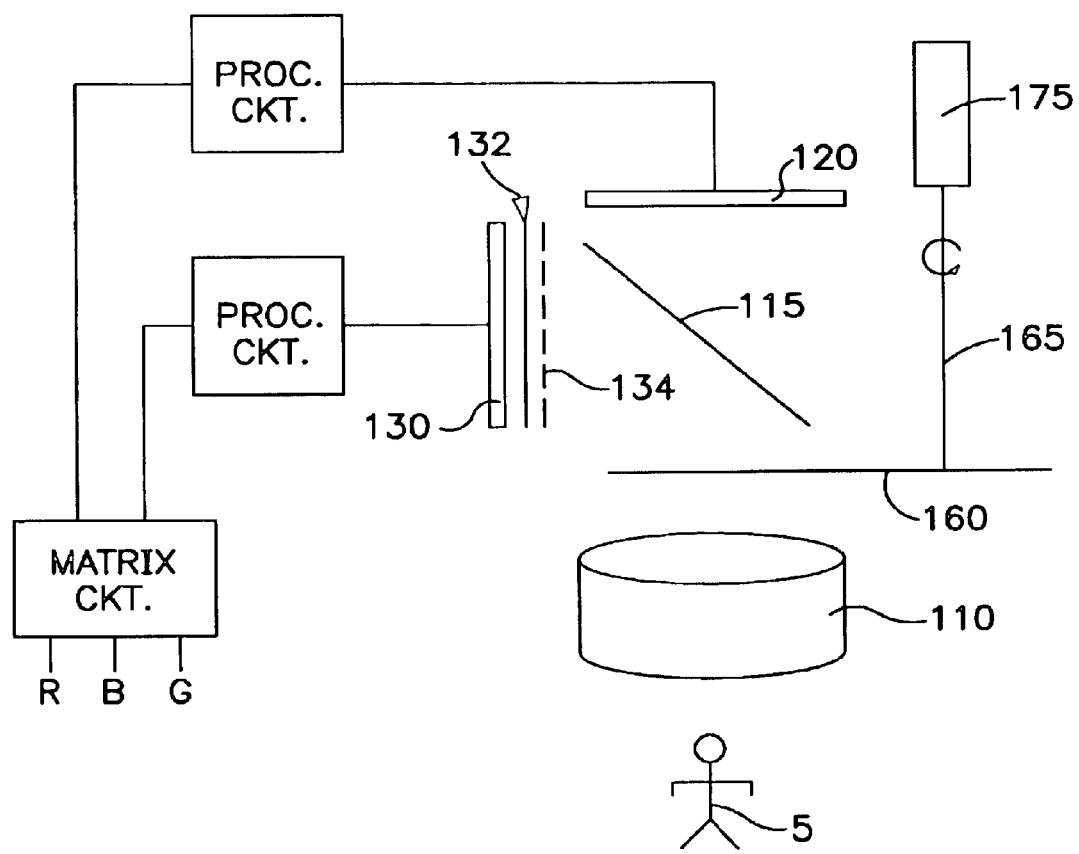
FIG. 1 is a schematic diagram, partially in block form, of an apparatus in accordance with an embodiment set forth in the parent application hereof.

FIG. 1 shows a camera system in accordance with an embodiment described in the parent application hereof. Light received from a scene 5 being viewed (typically, a moving scene) is received and focused by a motion picture film camera type of lens, represented in the Figure by lens 110, which is typically a multi-element lens or lens system. [As used herein, the term "lens system" is intended to generically cover a lens of one or more elements as well as a system of lenses. The term "lens" is sometimes used as convenient shorthand for a lens system.] Light focused by the lens is divided, by a pellicle beamsplitter 115, for incidence on sensors 120 and 130 which may be, for example, suitable CCD sensors. The sensor 120 is a luminance (Y) sensor, and the sensor 130 is provided with a color pattern filter 132 and serves as a color sensor. (The image on the color sensor is reversed, and can be electronically reversed back on readout). Each sensor is coupled with suitable processing circuitry (labeled 125 in the luminance channel and labeled 135 in the color channel), including color detect and matrix circuitry in the color channel, and suitable filtering in both channels. The signals can be combined and matrixed, as represented by the block 140 to obtain, for example, R, G, B, and/or color difference signals and luminance. Reference can be made, for example, to copending U.S. patent application Ser. No. 09/152,395 and copending U.S. patent application Ser. No. 09/362,603, both assigned to the same assignee as the present invention, and both disclosing aspects of two channel processing. It will be understood that features of the invention do not depend on a particular processing approach.

As noted in the parent application hereof, one of the advantages of the embodiments described therein is that they can employ high quality camera lenses designed for motion picture film cameras. The camera system of FIG. 1 is a two-sensor system with some special characteristics that permit use of such lenses. Typically the high quality lenses designed for motion picture film cameras have a relatively short back throw (less than about 1.5 times the image width) that is incompatible with the optical path length associated with the splitter (e.g. dichroic prism) of a three sensor camera. The system shown in FIG. 1, as in the parent application hereof, employs a pellicle splitter (115) that avoids the need for, say, the glass prism. The motion picture film camera lenses are not corrected for the aberrations introduced by the glass path and the two rather than three sensor design shortens the back throw behind the lens so that the motion picture film camera type of lenses (which have a relatively short back throw) can be used. [In another embodiment in this parent application hereof, summarized below, a rotating reflective shutter avoids the need for the glass dichroic prism.]

Figure 2:
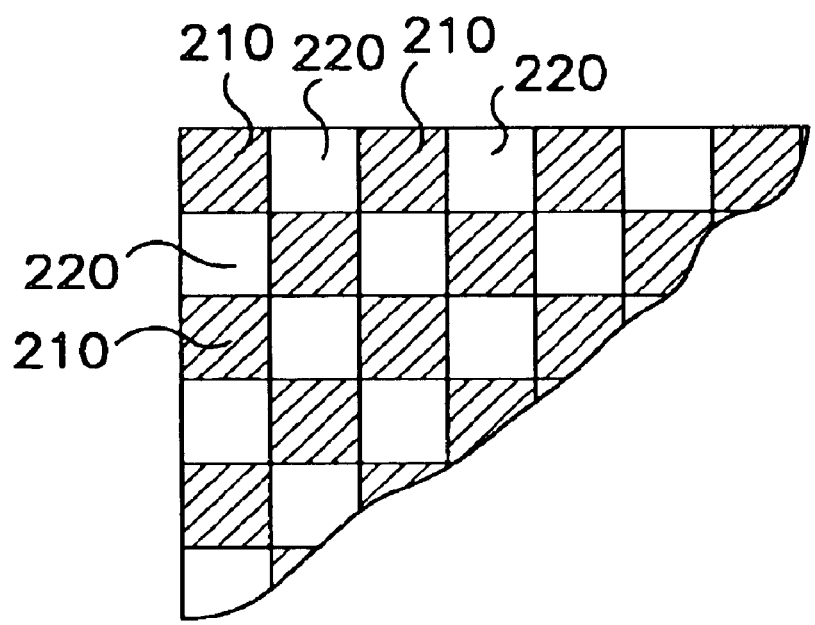
FIG. 2 is a partially broken away diagram illustrating the two color checkerboard pattern filter used in embodiments set forth in the parent application hereof.

In one form of the FIG. 1 embodiment of the parent application hereof, the pellicle 115 has a dichroic coating on it that passes a spectrum that makes the output from the Y sensor have the spectral distribution appropriate for Y. The remaining light is mostly red and blue. Therefore, in an embodiment of the parent application hereof, the color filter 132 of FIG. 1 employs red and blue diagonally sampled filters. This is shown in FIG. 2, which illustrates a checkerboard pattern having cross-hatched boxes 210 representative of red, and non-crosshatched boxes 220 representative of blue. This provides a diagonally sampled red and blue color output. The horizontal and vertical resolution of these colors is consequently the same as the luminance resolution. However, the diagonal resolution is half that of the luminance diagonal resolution. As noted in the parent application hereof, this can be acceptable since there is normally less detail in the diagonal directions in images and the human visual system has less color acuity on the diagonal. Using this filter, R-Y and B-Y can be derived from the signals from the two sensors. The Y signal is obtained from the luminance sensor 120. Reference can be made to the parent application for further details, and for description of operation of the pellicle filter of FIG. 1.

In a further embodiment of the FIG. 2 color filter of the parent application hereof, the checkerboard passes red and green; i.e., for example, the boxes 210 being red and the boxes 220 being green. This has the advantage of having blue (rather than green) be the derived color, since the derived color will have the lowest signal-to-noise ratio, and this can be best tolerated in the blue.

In reading out the checkerboard patterns, the R and G (or R and B) images in the checkerboard pattern can be decimated (e.g. by setting odd pixels to zero on line 1 (and all odd lines) and even pixels to zero on line 2 (and all even lines). Interpolation can be used to obtain the missing pixels. The luminance channel signal can be appropriately filtered to obtain a lower resolution luminance signal for derivation and processing in the color channel.

Because of the reduced diagonal resolution that results from the color patterns, it is desirable to use an optical pre-filter to avoid a color moire pattern being visible when there is detail on the diagonal. As described in the parent application hereof, one form of an optical prefilter, represented at 134 in FIG. 1, is a phase diffraction grating. Other forms of optical prefilter can alternatively be used in this configuration.

Figure 3:
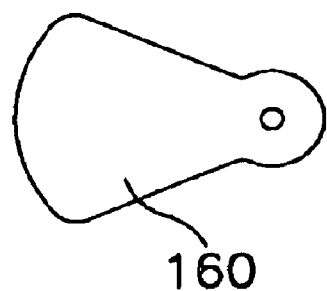
FIG. 3 is a diagram of a rotating shutter used in embodiments set forth in the parent application hereof.

As also described in the parent application hereof, depending on the type of sensor used, a shutter may be needed to cut off the light during charge transfer from the light sensing area to the storage area. [For background regarding use of a shutter, see U.S. Pat. No. 4,667,226.] This would only require about 1.5 ms, but should preferably be longer. A shorter exposure time improves motion blur for moving objects. In FIG. 1, a mechanical shutter 160 is driven on shaft 165 by motor 175. An embodiment of the shutter, as in the parent application hereof, is shown in FIG. 3.

Figure 4:
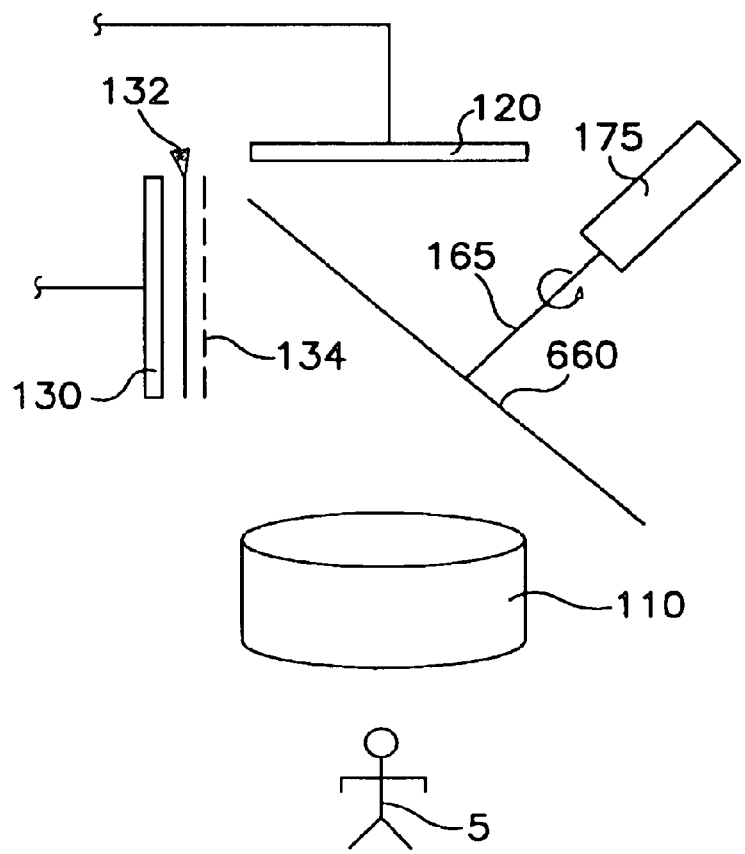
FIG. 4 is a schematic diagram, partially in block form, of another embodiment of an apparatus set forth in the parent application hereof.
Figure 5:
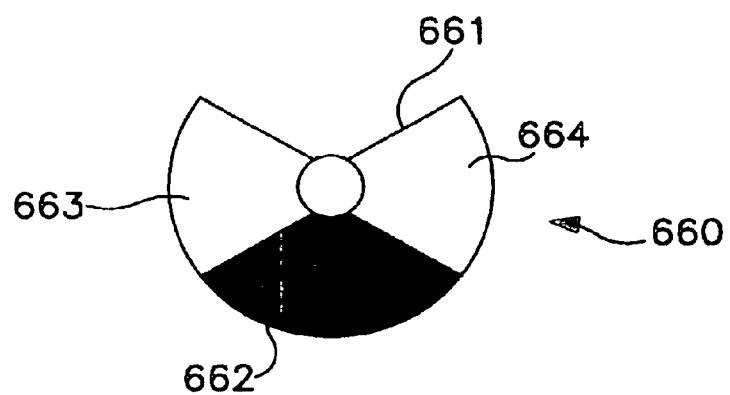
FIG. 5 is a diagram of a type of rotating shutter that can be utilized in the FIG. 4 configuration above, as in the parent application hereof.

A further embodiment of a mechanical shutter, as disclosed in the parent application hereof, is shown in FIGS. 4 and 5. In this case, the shutter (660) is in the usual position of a splitter, that is at a diagonal with respect to the image direction. The shutter 660 is driven by motor 175 to rotate with the shaft 165. The layout of shutter 660, which is actually a rotating combination shutter/mirror, is shown in FIG. 5, and it has on open sector 661 which opposes a dark opaque sector 662, as well as opposing mirror (reflective) sectors 663 and 664. The vertical transfer to the storage registers occurs when the dark sector of the shutter is over the lens. The open section exposes the Y sensor 120 and two mirror sections expose the color sensor 130. This produces a color exposure on either side temporally of the luminance exposure. Color is temporally longer but centered in time coincident with the Y exposure.

Figure 6:
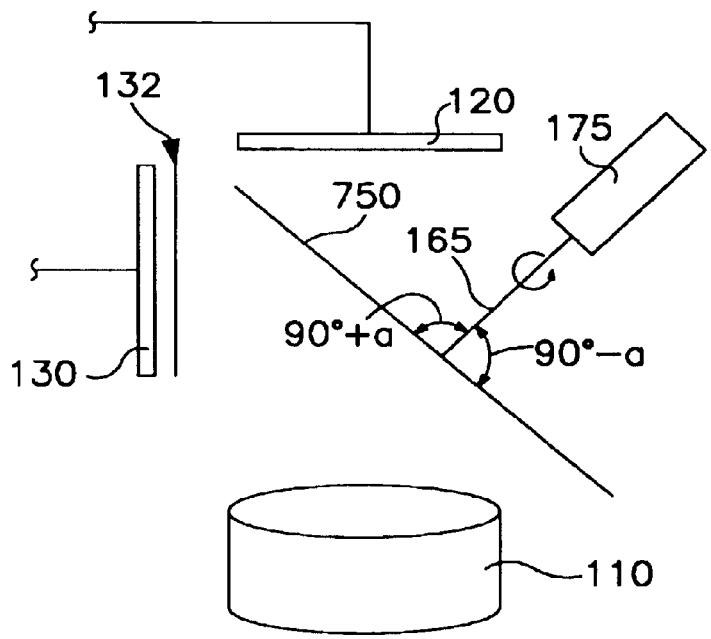
FIG. 6 is a diagram of a camera system in accordance with an embodiment of the present invention.
Figure 7:
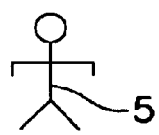
FIG. 7 is a diagram of an embodiment of the rotating reflective shutter of the FIG. 6 embodiment.
Figure 7:
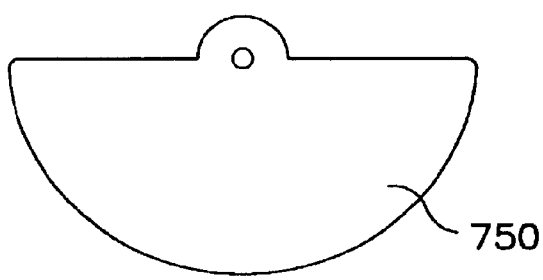
Figure 8:
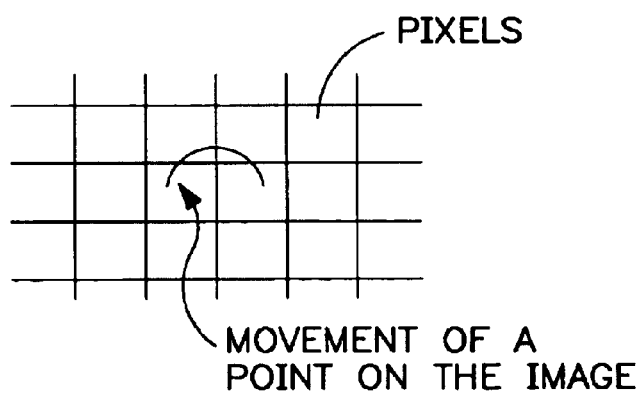
FIG. 8 is a diagram illustrating the manner in which a point in the image moves in the embodiment of FIGS. 6 and 7.

FIG. 6 illustrates an embodiment of the present invention. As in FIG. 4, sensor 120 is a luminance sensor and sensor 130 is provided with color pattern filter 132 and serves as a color sensor. As above, light received from scene 5 being viewed, is received and focused by a lens 110 which can be a motion picture film camera type of lens. In this embodiment, a reflective shutter 750, shown in FIG. 7, is again driven by a motor 175 to rotate with shaft 165. The shutter in this case is half reflective (toward the color sensor) and half transmissive (to the luminance sensor), although other fractions and configurations can be used. In accordance with a feature of the invention, and as seen in FIG. 6, the shutter is inclined by a small angle, a, with respect to the normal to the shaft, so that the image reflected therefrom will be subjected to a small wobble. The angle a is preferably in the range between 1 second of arc and 1 degree of arc. This can be understood from the diagram of FIG. 8, which shows a portion of the sensor and its pixel regions, and shows how a point in the image will move (in a circular arc)

due to the wobble that is introduced. The wobble excursion (which depends on the angle a and other optical parameters) is preferably at least one half of the sensor pixel spacing. This small defocusing of the image on the color sensor achieves the desired optical prefiltering without, for example, necessarily employing a separate optical prefilter. The angle a can be adjusted to select the prefiltering.

What is claimed is:

1. A method for producing electronic video signals representative of color images of a scene, comprising the steps of:

provim a luminance sensor and a color sensor having a color filter thereover;

providing a temporal beamsplitter, and providing a lens system that focuses light from said image, via said beamsplitter, alternately onto said luminance sensor and said color sensor; and producing electronic video signals from outputs of said luminance sensor and said color sensor;

said step of providing a temporal beamsplitter comprising providing a rotating mechanical shutter that includes an open sector that passes light from the image toward said luminance sensor and a mirrored sector that reflects light from the image toward the color sensor in the path of light from said image, and rotating said shutter in a manner to cause a wobble of the image on said color sensor.

2. The method as defined by claim 1, wherein said step of rotating said shutter includes mounting said shutter on a shaft such that said shutter is offset from the normal to said shaft by an angle that causes said wobble.

3. The method as defined by claim 2, wherein said angle is preferably in the range between 1 second of arc and 1 degree of arc.

4. The method as defined by claim 1, wherein said color sensor has a characteristic pixel spacing, and wherein the excursion of the image on said color sensor due to said wobble is at least half the pixel spacing.

5. The method as defined by claim 2, wherein said color sensor has a characteristic pixel spacing, and wherein the excursion of the image on said color sensor due to said wobble is at least half the pixel spacing.

6. The method as defined by claim 3, wherein said color sensor has a characteristic pixel spacing, and wherein the excursion of the image on said color sensor due to said wobble is at least half the pixel spacing.

7. The method as defined by claim 1, wherein said step of providing a lens system comprises providing a film camera type of lens system.

8. The method as defined by claim 2, wherein said step of providing a lens system comprises providing a film camera type of lens system.

9. The method as defined by claim 3, wherein said step of providing a lens system comprises providing a film camera type of lens system.

10. The method as defined by claim 1, wherein said step of providing a temporal beamsplitter includes providing said mechanical shutter with said open sector and said mirrored sector having substantially the same angular extent.

11. The method as defined by claim 3, wherein said step of providing a temporal beamsplitter includes providing said mechanical shutter with said open sector and said mirrored sector having substantially the same angular extent.

12. The method as defined by claim 1, wherein said step of providing a color filter over said color sensor comprises providing a color filter having a checkerboard pattern of two colors.

13. The method as defined by claim 3, wherein said step of providing a color filter over said color sensor comprises providing a color filter having a checkerboard pattern of two colors.

14. Apparatus for producing electronic video signals representative of color images of a scene, comprising:

a luminance sensor;

a color sensor having a color filter thereover;

a temporal beamsplitter;

a lens system, arranged to focus light from said image, via said beamsplitter, alternately onto said luminance sensor and said color sensor; and means for producing electronic video signals from outputs of said luminance sensor and said color sensor;

said temporal beamsplitter comprising a rotating mechanical shutter that includes an open sector that passes light from the image toward said luminance sensor and a mirrored sector that reflects light from the image toward the color sensor in the path of light from said image, and means for rotating said shutter in a manner to cause a wobble of the image on said color sensor.

15. Apparatus as defined by claim 14, wherein said means for rotating said shutter includes mounting said shutter on a shaft such that said shutter is offset from the normal to said shaft by an angle that causes said wobble.

16. Apparatus as defined by claim 15, wherein said angle is preferably in the range between 1 second of arc and 1 degree of arc.

17. Apparatus as defined by claim 15, wherein said color sensor has a characteristic pixel spacing, and wherein the excursion of the image on said color sensor due to said wobble is at least half the pixel spacing.

18. Apparatus as defined by claim 16, wherein said color sensor has a characteristic pixel spacing, and wherein the excursion of the image on said color sensor due to said wobble is at least half the pixel spacing.

19. Apparatus as defined by claim 15, wherein said lens system comprises a film camera type of lens system.

20. Apparatus as defined by claim 18, wherein said lens system comprises a film camera type of lens system.

* * * * *